Patented Oct. 10, 1922.

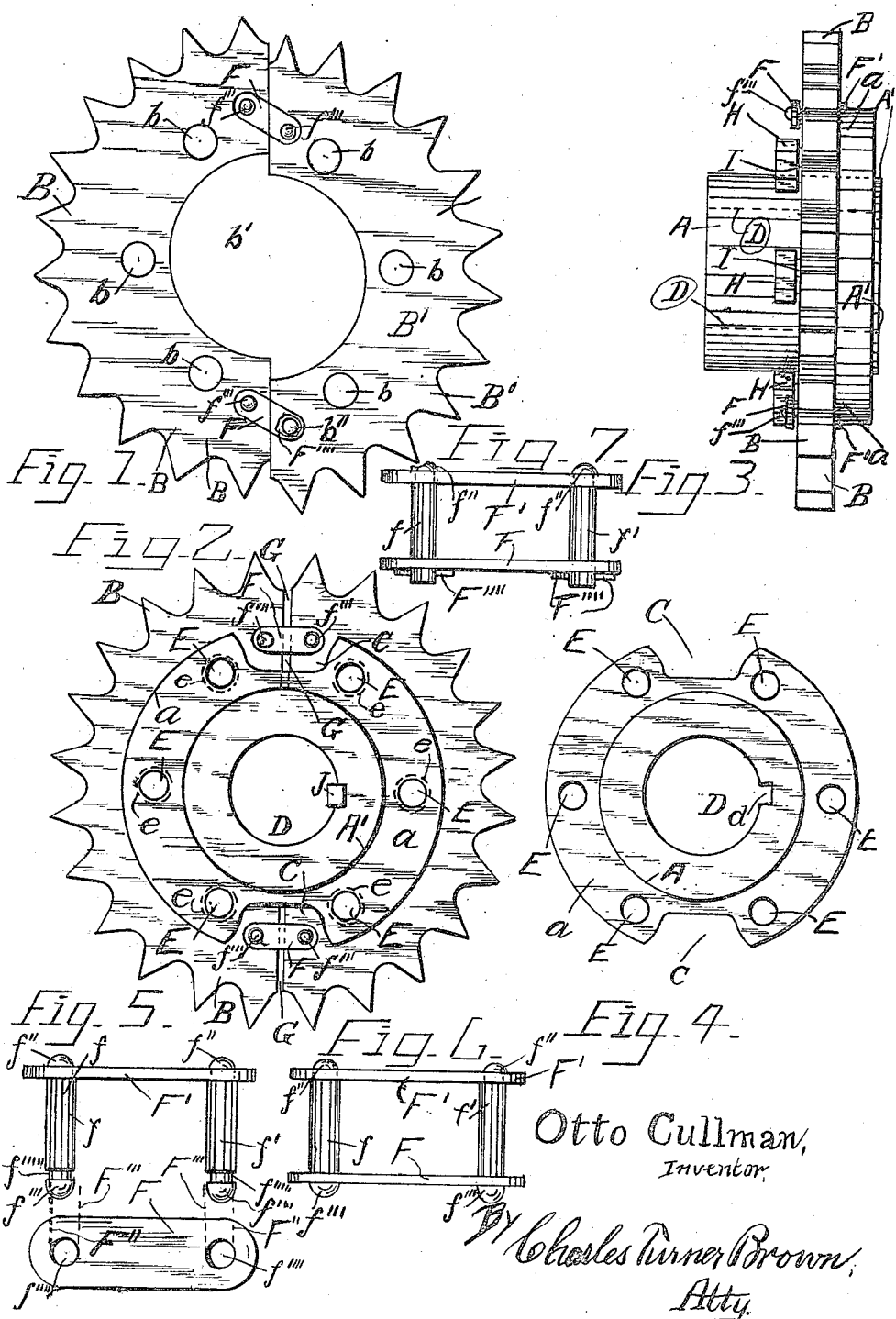

1,431,374

UNITED STATES PATENT OFFICE.

OTTO CULLMAN, OF CHICAGO, ILLINOIS.

SPLIT SPROCKET.

Application filed August 5, 1921. Serial No. 490,073.

*To all whom it may concern:*

Be it known that I, OTTO CULLMAN, a citizen of the United States, and a resident of Chicago, in the county of Cook and State of Illinois, have invented certain new and useful Improvements in Split Sprockets, of which the following, reference being had to the drawing accompanying and forming a part hereof, is a full and complete specification.

This invention relates to sprockets which are adapted to be co-operatively used with sprocket chains, as driving and driven members.

Among the objects of the invention is to obtain a split sprocket which can be made in commercial quantities, to operate with sprockets chains in the same manner and with equal accuracy as when the sprocket is not split. An additional object is to obtain a split sprocket which can be made, assembled, and put into use by persons ordinarily skilled in making and using sprockets and chains. An additional object is to obtain a split sprocket, the parts of which possess, to a limited degree, relative flexibility; which is economically made, and not liable to get out of order or relative position before, or while being mounted on its hub. An additional object is to obtain a split sprocket which can be removed from its hub, (when worn), by ordinary mechanics, without interfering with the shaft on which the hub is mounted, and a substitute split sprocket can be placed on said hub.

In the drawings referred to Fig. 1 is a plan view of a split sprocket, in position to show the relative flexibility of its parts, when unmounted.

Fig. 2 is a rear elevation of a split sprocket mounted on its hub.

Fig. 3 is a side, or edge elevation of the split sprocket and its hub.

Fig. 4 is a rear elevation of the hub of the split sprocket.

Fig. 5 is an edge view of a connecting link and a top plan view of a detachable pin plate co-actuable with the grooved ends of the pins of the connecting link.

Fig. 6 is an edge view of a connecting link and the pin plate thereof joined thereto; and Fig. 7 is an edge view of a modified connecting link and pin plate joined thereto.

A reference character applied to designate a given part indicates said part throughout the several figures of the drawing, wherever the same appears.

A $a$ A', represent a hub of a plurality of diameters on which hub the split sprocket B, B', is illustrated as mounted. $b$, $b$, represent apertures in sprocket B B', and $b'$ a central or axial aperture. C, C, represent recesses in the periphery of part $a$ of hub A $a$ A'. D represents a central and axial aperture in the hub; and E, E, additional apertures in said hub. Apertures $b$, $b$, in sprocket B B', and apertures E, E, in the hub are in spaced relation to each other and to the central apertures $b'$ and D, respectively. Apertures E, E, are provided with the internal screw threads $e$, $e$, (Fig. 2).

The apertures $b$, $b$, register with apertures E, E, when the sprocket is forced into close contact with part $a$ of the hub A $a$ A', with part A of said hub in aperture $b'$ of the sprocket.

F represents a pin plate of a sprocket chain which is designed to fit and run on the teeth of the sprocket B B', and F', combined with pins $f$, $f'$, (Fig. 5), represents a connecting link of said sprocket chain. $f''$, $f''$, represent the ends of pins $f$, $f'$, which project beyond the plate F' of the connecting link. $f'''$ represents ends projecting ends of pins $f$, $f'$, and $f''''$ apertures in plate F, through which said ends $f'''$, $f'''$ may be extended. $f'''''$ represent grooves. The broken lines F'' and F''', Fig. 5, represent the relative positions of the heads $f'''$, $f'''$ and apertures $f''''$, $f''''$, the arrangement being such that when the pin plate F is forced on to the heads $f'''$, $f''''$ of the pins $f$, $f'$, the outside edges of the apertures will be underneath the outside edges of the head, when the pin plate is in the grooves $f'''''$, $f'''''$. The last recited relative position and operation of the several parts named is the usual construction on what are known in the trade as "snap-on" repair links.

In Fig. 7 F'''' represent cotter pins which are designed to hold the pin plate F on pins $f$, $f'$.

Pins $f$, $f'$ are rigidly secured in plate F', in the tie illustrated as forming an element of the embodiment of this invention, as in the ordinary construction of connecting links of sprocket chains.

In the assembling of the elements of the split sprocket, after said sprocket has been divided, pins $f$, $f'$ extend through and fit snugly in apertures $b''$ which are provided therefor in said sprocket, (a portion of pin plate F is removed at $F''''$, Fig. 1, to expose one of said apertures $b''$ to view).

The apertures in the split sprocket ($b''$, $b''$), are in spaced relation to each other, and said apertures, as well as apertures $b$, $b$, $b'$, are made in the sprocket before it is divided by the cut G, (Fig. 2), to make the parts B, B' thereof. H, H, represent cap screws, the threads whereof engage with threads $e$, $e$, in apertures E, E. I, I, represent spring washers, (Fig. 3) and J a key or feather (Fig. 2) in key way $d$, (Fig. 4).

When this split sprocket is shipped without a hub, to replace a worn split sprocket, the parts of the sprocket are moved into substantially the relative position thereof illustrated in Fig. 1, as thereby the spaced relation of said parts is less liable to be changed than would be the case were said sprocket shipped with the parts thereof in the relative position illustrated in Fig. 2 of the drawing, (that is, with the sides of the cut G in spaced relation).

To replace a worn sprocket, after said worn sprocket has been removed from its hub, (without injury to said hub) and without change of its relation to the shaft on which it is mounted, or to additional hubs or wheels on said shaft, the pins $f$, or $f'$, on one of the parts of the sprocket B B', are removed, and the parts thereby separated. The parts of the sprocket are then placed on the shaft, adjacent to the hub, and the removed pins returned to their original position in the sprocket and in the links, (F, F'). The sprocket is then put on the hub, the cap screws H, H, inserted in apertures $b$, $b$, and turned to place in apertures E, E.

Because the apertures for the pins $f$, $f'$ are made before the parts of the sprocket are separated by cuts G, G, and because said pins are in spaced relation, but not necessarily in spaced relation to apertures $b$, $b$, and $b'$); and because, further, while sprocket B B' is divided into substantially equal parts by cuts G, G, said cuts are not, and at times can not be such as to divide the sprocket into exact equal parts; I number said parts of the sprocket adjacent to the apertures through which the pins of the link extend with corresponding numerals. The numbering of the links is not required, as by the construction herein described the links used are standardized, and a substitution of one for the other does not destroy the adjustment of the parts. Where a plurality of unmounted sprocket wheels are shipped together, they are numbered consecutively, so that the two parts of a given sprocket will be sure to be assembled together, in proper related position.

To assemble the split sprocket B B', on hub A $a$ A', the pins $f$, $f'$ are placed in apertures provided therefor in side links F'', F', (see Fig. 3), and thereafter said pins are inserted in the apertures provided therefor in sprocket B B', and in links F, F. The parts forming the sprocket B B', are then placed over the part A of hub A $a$ A', and forced into close contact with part $a$ of said hub, the apertures $b$, $b$, in said sprocket registering with apertures E, E, of said hub. Spring washers I, I, are, preferably used, and are placed on cap screws or bolts H, H, and said cap screws, (or bolts) are inserted in apertures $b$, $b$, and turned to engage the screw threads thereon with the screw threads $e$, $e$, in apertures E, E, of part A of the hub. These cap screws, (or bolts) are turned tightly to place, and the parts of the sprocket B B' are thereby firmly secured on the hub, in proper relation to each other and to said hub.

It will be observed that the recesses C, C, respectively afford space for links F', F'.

I claim;

As a new article of manufacture a split sprocket and a hub, said sprocket provided with an aperture and fitting tightly to said hub and with additional apertures in said sprocket in spaced relation, and said hub provided with apertures in spaced relation arranged to register with said spaced apertures in the sprocket, cap screws extending through said spaced apertures and adapted to rigidly join said members of the sprocket to said hub, and said members provided with additional apertures positioned on opposite sides of the cut splitting said sprocket, and in spaced relation, with means to join in flexible relation, when unmounted, the members of said sprocket, said means comprising said plates and pins of a sprocket chain. with said pins extending through said positioned apertures and said side plates.

OTTO CULLMAN.

Witnesses:
CHARLES TURNER BROWN.
BESS S. BROWN.